United States Patent
Xu et al.

(10) Patent No.: US 8,582,194 B2
(45) Date of Patent: Nov. 12, 2013

(54) THERMALLY RESPONSIVE CRYSTALLINE COLLOIDAL ARRAYS

(75) Inventors: Xiangling Xu, Pittsburgh, PA (US); Noel R. Vanier, Wexford, PA (US); Sean Purdy, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 374 days.

(21) Appl. No.: 12/770,070

(22) Filed: Apr. 29, 2010

(65) Prior Publication Data

US 2011/0267677 A1    Nov. 3, 2011

(51) Int. Cl.
*G02F 1/19*    (2006.01)

(52) U.S. Cl.
USPC .......................................................... 359/288

(58) Field of Classification Search
USPC .................. 359/241, 245, 248, 288, 820; 252/582–586; 427/385.5
See application file for complete search history.

(56) References Cited

U.S. PATENT DOCUMENTS

| | | |
|---|---|---|
| 4,833,172 A | 5/1989 | Schwarz et al. |
| 5,122,905 A | 6/1992 | Wheatley et al. |
| 5,266,238 A | 11/1993 | Haacke |
| 5,281,370 A | 1/1994 | Asher et al. |
| 5,330,685 A | 7/1994 | Panzer |
| 5,527,386 A | 6/1996 | Statz |
| 5,624,731 A | 4/1997 | Desjardins |
| 5,711,884 A | 1/1998 | Asher et al. |
| 5,783,120 A | 7/1998 | Ouderkirk et al. |
| 5,824,733 A | 10/1998 | Dobert et al. |
| 5,854,078 A | 12/1998 | Asher et al. |
| 5,932,309 A | 8/1999 | Smith et al. |
| 6,097,530 A | 8/2000 | Asher et al. |
| 6,114,023 A | 9/2000 | Schwarz et al. |
| 6,165,389 A | 12/2000 | Asher |
| 6,187,599 B1 | 2/2001 | Asher et al. |
| 6,299,979 B1 | 10/2001 | Neubauer et al. |
| 6,337,131 B1 | 1/2002 | Rupaner et al. |
| 6,753,131 B1 * | 6/2004 | Rogers et al. ................ 430/322 |
| 6,753,191 B2 | 6/2004 | Asher et al. |
| 6,782,115 B2 | 8/2004 | Decker et al. |
| 6,894,086 B2 | 5/2005 | Munro et al. |
| 7,008,567 B2 | 3/2006 | Foulger et al. |
| 2002/0054680 A1 | 5/2002 | Huang et al. |

(Continued)

FOREIGN PATENT DOCUMENTS

| | | |
|---|---|---|
| EP | 2287232 | 2/2011 |
| WO | 2004063432 A1 | 7/2004 |

(Continued)

OTHER PUBLICATIONS

Endo, Tatsuro et al., "Colorimetric detection of volatile organic compounds using a colloidal crystal-based chemical sensor for environmental applications," Sensors and Actuators B, 2007, pp. 589-595, vol. 125, Elsevier B.V.

(Continued)

*Primary Examiner* — Tuyen Tra
(74) *Attorney, Agent, or Firm* — Julie Meder

(57) ABSTRACT

A thermally responsive material comprising an ordered periodic array of particles received in a substantially nonaqueous matrix composition. The material diffracts radiation in a first wavelength band when the material is at a first temperature and the material diffracts radiation in a second wavelength band when the material is at a second temperature.

20 Claims, 5 Drawing Sheets

(56) References Cited

U.S. PATENT DOCUMENTS

| | | | |
|---|---|---|---|
| 2002/0143073 A1 | 10/2002 | Jiang et al. | |
| 2002/0164823 A1* | 11/2002 | Asher et al. | 436/518 |
| 2006/0137601 A1 | 6/2006 | Miguez et al. | |
| 2006/0191442 A1 | 8/2006 | He et al. | |
| 2006/0235086 A1 | 10/2006 | Maskaly et al. | |
| 2006/0254315 A1 | 11/2006 | Winkler et al. | |
| 2007/0100026 A1 | 5/2007 | Munro et al. | |
| 2007/0165903 A1 | 7/2007 | Munro et al. | |
| 2008/0188381 A1 | 8/2008 | Xu et al. | |
| 2009/0038512 A1 | 2/2009 | Xu et al. | |
| 2009/0155545 A1 | 6/2009 | Purdy et al. | |
| 2009/0317623 A1 | 12/2009 | Purdy et al. | |
| 2011/0105656 A1* | 5/2011 | Sawada et al. | 524/105 |

FOREIGN PATENT DOCUMENTS

| | | |
|---|---|---|
| WO | 2004098793 | 11/2004 |
| WO | 2006069702 | 7/2006 |
| WO | 2009148082 | 12/2009 |

OTHER PUBLICATIONS

Nagao, Daisuke et al., "Preparation of highly monodisperse poly(methyl methacrylate) particles incorporating fluorescent rhodamine 6G for colloidal crystals," Journal of Colloid and Interface Science, 2006, pp. 232-237, vol. 298, Elsevier Inc.

Fudouzi, Hiroshi et al., "Colloidal Crystals with Tunable Colors and Their Use as Photonic Papers," Langmuir, 2003, pp. 9653-9660, vol. 19, American Chemical Society, USA.

Rao, A. Venkateswara et al., "Comparative studies of the physical and hydrophobic properties of TEOS based silica aerogels using different co-precursors," Science and Technology of Advanced Materials, 2003, pp. 509-515, vol. 4.

Hotta, Yuji, "Coated polystyrene particles as templates for ordered macroporous silica structures with controlled wall thickness," J. Mater. Chem., 2003, pp. 496-501, vol. 13.

Xu, Xiangling et al., "Synthesis and Utilization of Monodisperse Superparamagnetic Colloidal Particles for Magnetically Controllable Photonic Crystals," Chem. Mater., 2002, pp. 1249-1256, vol. 14, No. 3, American Chemical Society, USA.

Xu, Xiangling et al., "Mesoscopic Monodisperse Ferromagnetic Colloids Enable Magnetically Controlled Photonic Crystals," J. Am. Chem. Soc., 2002, pp. 13864-13868, vol. 124, American Chemical Society, USA.

Zeng, Fang et al., "Urea sensing materials via solidified crystalline colloidal arrays," Sensors and Actuators B, 2002, pp. 273-276, vol. 81, Elsevier Science B.V.

Zeng, Fang et al., "Preparation and dynamic viscoelastic properties of strengthened solidified colloidal crystals," Reactive & Functional Polymers, 2002, pp. 39-44, vol. 53, Elsevier Science B.V.

Xu, Xiangling et al., "Superparamagnetic Photonic Crystals," Advanced Materials, Nov. 16, 2001, pp. 1681-1684, vol. 13, No. 22, Wiley-VCH Verlag GmbH, Weinheim, Germany.

Jethmalani, Jagdish M. et al., "Diffraction of Visible Light by Ordered Monodisperse Silica-Poly(methyl acrylate) Composite Films," Chem. Mater., 1996, pp. 2138-2146, vol. 8, American Chemical Society, USA.

Pfaff et al., "Angle-Dependent Optical Effects Deriving from Submicron Structures of Films and Pigments," Chemical Review 1999, Mar. 15, 1999, pp. 1963-1981, vol. 99, American Chemical Society.

Velev, O. D. et al., "Porous silica via colloidal crystallization," Nature, Oct. 2, 1997, pp. 447-448, vol. 389, Macmillan Publishers Ltd.

Sperling, L.H., et al., "Interpenetrating Polymer Networks," pp. 427-431.

Watanabe, Masayoshi et al., "Nanostructured Colloidal Array in an Ionic Liquid," ECS Meeting Abstracts 802, 2981 (2008).

Chen, Yilong et al., "Preparation and thermo-responsive light diffraction behaviors of soft polymerized crystalline colloidal arrays", Soft Matter; Dec. 14, 2006; pp. 571-579; 3; The Royal Society of Chemistry.

Ueno, Kazuhide et al., "A soft glassy colloidal array in ionic liquid, which exhibits homogeneous, non-brilliant and angle-independent structural colours", Chem. Commun.; May 11, 2009; pp. 3603-3605; 2009; The Royal Society of Chemistry.

Ueno, Kazuhide et al., "Thermosensitive, Soft Glassy and Structural Colored Colloidal Array in Ionic Liquid: Colloidal Glass to Gel Transition", Langmuir; Oct. 27, 2010; pp. 18031-18038; 2010, 26 (23); American Chemical Society.

* cited by examiner

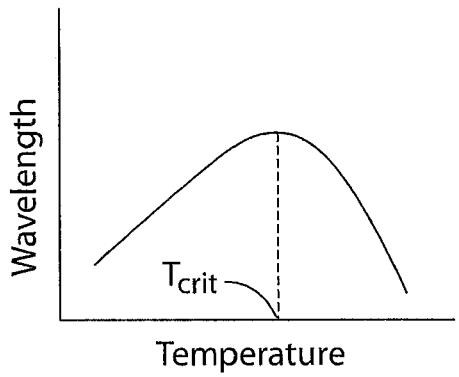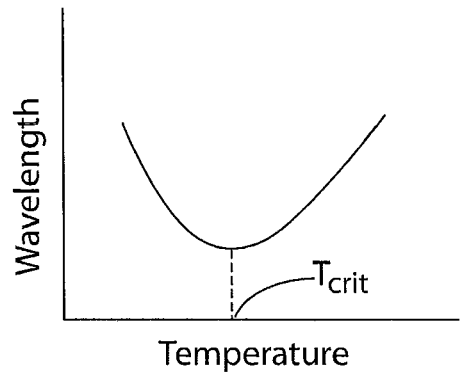
FIG. 2A  FIG. 2B
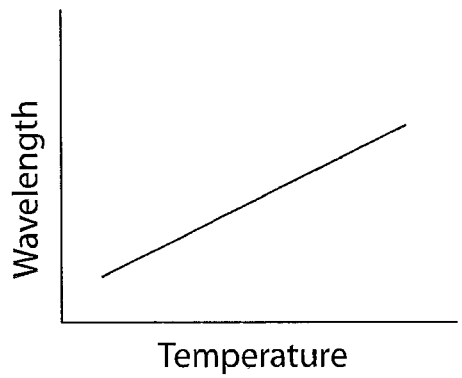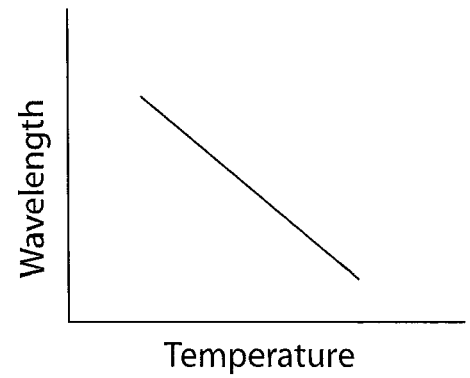
FIG. 3A  FIG. 3B

THERMALLY RESPONSIVE CRYSTALLINE COLLOIDAL ARRAYS

FIELD OF THE INVENTION

This invention relates to thermally responsive materials, more particularly to thermally responsive materials that exhibit a change in the wavelength of the diffraction with a change in temperature.

BACKGROUND OF THE INVENTION

Thermally responsive materials based on crystalline colloidal arrays have been used for a variety of purposes. A crystalline colloidal array (CCA) is a three-dimensional ordered array of mono-dispersed colloidal particles. The particles are typically composed of a polymer latex, such as polystyrene or an inorganic material, such as silica.

Such colloidal dispersions of particles can form crystalline structures having lattice spacings that are comparable to the wavelength of ultraviolet, visible, or infrared radiation. These crystalline structures have been used for filtering narrow bands of selected wavelengths from a broad spectrum of incident radiation, while permitting the transmission of adjacent wavelengths of radiation. Prior devices have been created by dispersing particles in a liquid medium, whereby the particles self-align into an ordered array. The particles may be fused together by mutual polymerization or by introducing a solvent that swells and fuses the particles together.

In other uses of CCAs, an ordered array is fixed in a matrix and may be used to exhibit color when the fixed array diffracts radiation in the visible spectrum. Alternatively, CCAs are fabricated to diffract radiation for use as optical filters, optical switches and optical limiters. While these CCAs use constant interparticle spacing, other CCAs may be thermally active whereby the interparticle spacing varies in response to stimuli, such as a temperature change.

Thermally responsive CCAs conventionally have been produced from hydrogels as a matrix material with a CCA embedded therein. In hydrogel-based devices, mono-dispersed, highly-charged colloidal particles are dispersed in an aqueous media. The particles self-assemble into a CCA due to their electrostatic charges. These ordered structures diffract radiation according to Bragg's law, wherein the radiation meeting the Bragg conditions is reflected while adjacent spectral regions that do not meet the Bragg conditions are transmitted through the device.

An ordered periodic array of particles that diffracts radiation according to Bragg's law satisfies the equation:

$$m\lambda = 2nd \sin\theta$$

where m is an integer, $\lambda$ is the wavelength of reflected radiation, and n is the effective refractive index of the array, d is the distance between the layers of particles, and $\theta$ is the angle that the reflected radiation makes with the plane of a layer of particles. Incident radiation is partly reflected at an uppermost layer of particles in the array at angle $\theta$ to the plane of the first layer and is partially transmitted to underlying layers of the particles. While some absorption incident radiation occurs as well, a portion of the transmitted radiation is partially reflected at the second layer of particles in the array at angle $\theta$ and partially transmitted to the underlying layers of particles. This feature of partial reflection at angle $\theta$ and partial transmission to the underlying layers of particles continues through the thickness of the array. The wavelength $\lambda$ of diffracted radiation can be controlled by the dimension d, which may be the distance between the planes of the centers of the particles in each layer. Initially, the diffracted wavelength $\lambda$ is proportional to the particle diameter for an array of packed particles. However, when distance d between layers of particles in a periodic ordered array increases, the wavelength of diffracted radiation also increases. By increasing the particle size or the volume of the matrix in response to a stimulus, the inter-particle distance between layers of particles increases, thereby altering the wavelength of diffracted radiation.

In a hydrogel-based CCA, the particles and/or the volume of the hydrogel matrix changes in response to temperature changes, thereby changing the diffraction wavelength of the CCA. Such CCA devices that are based on hydrogels typically contain a large percentage of water, i.e., at least about 30% by volume of water. For hydrogel-based CCAs, the colloidal particles and/or the hydrogel matrix are composed of a material that undergoes a change in its spatial dimensions in response to a temperature change. The spatial dimension change may be due to dehydration of the hydrogel particles and/or hydrogel matrix at elevated temperatures or expansion of the water within the hydrogel CCA at reduced temperatures. As such, hydrogel CCAs are functional only within a limited temperature range, the temperature at which water is liquid. These hydrogel CCAs are also prone to dehydration from evaporation of the water, even at room temperature. Such dehydration alters the inter-particle dimensions, creating instability in the hydrogel CCA.

SUMMARY OF THE INVENTION

The present invention includes a thermally responsive material comprising an ordered periodic array of particles received in a substantially nonaqueous matrix composition. The material diffracts radiation in a first wavelength band when the material is at a first temperature, and the material diffracts radiation in a second wavelength band when the material is at a second temperature. Also included is a method of controlling radiation reflected from a surface of a substrate comprising applying the thermally responsive material of the present invention to at least a portion of a surface of a substrate and exposing the substrate surface bearing the thermally responsive material to radiation at an exposure temperature, such that the material reflects a wavelength band of radiation at the exposure temperature. The present invention further includes a method of making a thermally responsive material comprising providing an ordered periodic array of particles on a substrate, coating the array of particles with a substantially nonaqueous curable matrix composition, wherein the matrix composition comprises (i) a curable component and (ii) a component that swells the curable component in response to a change in temperature and curing the matrix composition to produce material that diffracts radiation.

BRIEF DESCRIPTION OF THE DRAWINGS

FIGS. 2A-2B are graphs of other responses of the diffraction peak of the material of the present invention to temperature change;

FIGS. 3A-3B are graphs of other responses of the diffraction peak of the material of the present invention to temperature change;

DETAILED DESCRIPTION OF THE INVENTION

Figure 1A:
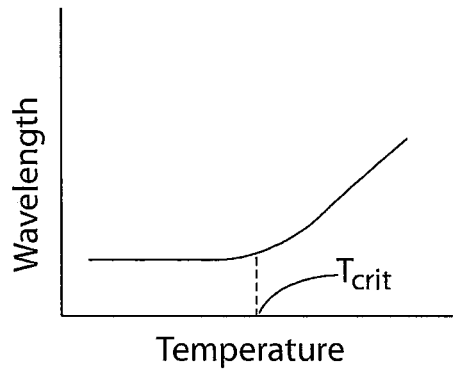
FIGS. 1A-1D are graphs of responses of the diffraction peak of the material of the present invention to temperature change.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids. The term "infuse" and related terms (such as infusion) refer to penetration from a liquid phase.

The present invention includes thermally responsive material that is responsive to temperature change, where the material diffracts radiation in the visible and/or non-visible electromagnetic spectrum and methods for making the same. As used herein, when a periodic array of particles is said to diffract radiation or reflect radiation according to Bragg's law, it is meant that at least some incident radiation is diffracted by the crystalline structure of the array, thereby producing some reflected radiation according to Bragg's law. The material includes an ordered periodic array of particles received in a polymeric matrix. The array includes a plurality of layers of the particles and satisfies Bragg's law of:

$$m\lambda = 2nd \sin \theta$$

where m is an integer, n is the effective refractive index of the array, d is the distance between the layers of particles, and $\lambda$ is the wavelength of radiation reflected from a plane of a layer of the particles at angle $\theta$. As used herein, "a" wavelength of diffracted radiation includes a band of the electromagnetic spectrum around that wavelength. For example, reference to a wavelength of 600 nanometers (nm) may include 595 to 605 nm. The present invention is described in reference to a diffraction wavelength or diffraction peak, which means a peak band of radiation reflected upon diffraction by the material of the present invention. Thus, "diffraction wavelength" refers to band of radiation having wavelengths that generally satisfy Bragg's law. In particular, the present invention includes material that exhibits a shift in the diffraction wavelength when the material changes temperature, as described below, referred to herein as thermally responsive material. The reflected radiation may be in the visible spectrum or invisible spectrum (infrared or ultraviolet radiation).

The thermally responsive material of the present invention generally includes a CCA having a periodic array of particles, which is held in a matrix. Parallel layers or planes formed by the periodic array of particles interact with incident radiation in accordance with Bragg's law. The diffraction wavelength of the light at a given angle is proportional to the distance between the Bragg planes formed by the periodic array of particles. The response of the material of the present invention to changes in temperature is at least in part due to a change in the distance between the Bragg planes that occurs with temperature change. The diffraction wavelength also depends on the effective refractive index of the material. The effective refractive index of the thermally responsive material is closely approximated as a volume average of the refractive index of the components of the thermally responsive material, including the particles and the matrix composition surrounding the particles. The intensity of the diffracted radiation is dependent on the refractive index variation within the thermally responsive material as dictated by the arrangement of the particles and the surrounding matrix composition. Higher refractive index contrast between alternating layers also produces greater diffraction intensity. Higher refractive index contrast between alternating layers can be achieved by using particles and matrix composition having a relative large difference in their respective indices of refraction. Alternatively, directionally expanding the particles and/or the matrix can alter the layered structure and increase the refractive index contrast between the layers.

Particles

Suitable materials for the particles include poly(vinyl-napthalene), polystyrene, polyurethane, acrylic polymers, alkyd polymers, polyester, siloxane-containing polymers, polysulfides, epoxy-containing polymers, and polymers derived from epoxy-containing polymers, as well as inorganic materials, such as metal oxides (e.g., alumina, silica, or titanium dioxide) or semiconductors (e.g., cadmium selenide) or composites of these materials.

In one embodiment, the particles have a generally unitary structure. As used herein, "unitary structure" refers to a feature of the particles each having a generally uniform structure without component structures, although the composition thereof may vary through the unitary particles, such as may occur upon diffusion of solvent or matrix therein. Alternatively, the particles may have a core-shell structure where the core is produced from a different composition from the shell composition. Suitable compositions for the particle core include polymers, such as polystyrene, polyurethane, acrylic polymers, alkyd polymers, polyester, siloxane-containing polymers, polysulfides, epoxy-containing polymers, or polymers derived from epoxy-containing polymers, as well as inorganic materials, such as metal oxides (e.g., alumina, silica, or titanium dioxide) or semiconductors (e.g., cadmium selenide). Suitable compositions for the shell include organic polymers (e.g., polystyrene, polyurethane, acrylic polymers, alkyd polymers, polyester, siloxane-containing polymers, polysulfides, epoxy-containing polymers, or polymers derived from epoxy-containing polymers), with the composition of the particle shell differing from the matrix material for a particular array of the core-shell particles. The shell material may be non-film-forming (i.e., cured or crosslinked), meaning that the shell material remains in position surrounding a particle core without forming a film of the shell material so that the core-shell particles remain as discrete particles within the polymeric matrix. As such, the array includes at least three general regions of the matrix, the particle shell, and the particle core. Alternatively, the shell composition may be film-forming whereby the shell composition forms a film around the cores. The core composition and the shell composition have different indices of refraction. In addition, the refractive index of the shell may vary as a function of the shell thickness in the form of a gradient of refractive index through the shell thickness. The refractive index gradient may be a result of a gradient in the composition of the shell through the shell thickness. For particles that are generally spherical, the diameter of the core may constitute 85 to 95% of the total particle diameter or 90% of the total particle diameter with the shell constituting the balance of the particle diameter and having a radial thickness dimension.

In one embodiment, the particle cores are produced via emulsion polymerization of core-precursor monomers in the presence of a surfactant, yielding a dispersion of the cores. Suitable surfactants for dispersion of organic polymer particles include, but are not limited to, sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion. Shell monomers are added to the core particle dispersion, along with a surfactant (as described above) such that the shell monomers polymerize onto the core particles. The core-shell particles are purified from the dispersion by techniques such as ultra-filtration, dialysis, or ion-exchange to remove undesired materials, such as unreacted monomer, small polymers, water, initiator, surfactant, unbound salt, and grit (agglomerated particles) to produce a monodispersion of charged core-shell particles. Ultra-filtration is particularly suitable for purifying charged particles. When the particles are in dispersion with other materials, such as salts or by-products, the repelling forces of the charged particles can be mitigated; therefore, the particle dispersion is purified to essentially contain only the charged particles which then readily repel each other and form an ordered array on a substrate as described below.

In another embodiment of the present invention, unitary-structured particles are produced by dispersing monomers with initiators in solution to produce unitary particles as described above with regard to preparing the cores of the core-shell particles. A dispersion of the unitary particles is purified as described above to produce a dispersion of only the charged unitary particles, which then form an ordered array on a substrate as described below.

Array of Particles

Upon removal of the excess raw material, by-products, solvent, and the like, electrostatic repulsion of the charged particles causes the particles to self-assemble into an ordered array. The purified dispersion of particles is applied to a substrate and dried. The dispersion of the particles applied to the substrate may contain 10-70 vol. % of charged particles or 30-65 vol. % of charged particles. The dispersion can be applied to the substrate by dipping, spraying, brushing, roll-coating, curtain coating, flow-coating, or die-coating to a desired thickness. The wet coating may have a thickness of 4-50 microns, such as 20 microns. Upon drying, the material contains essentially only the particles that have self-assembled in a Bragg array and diffract radiation accordingly.

Matrix

The matrix composition is substantially nonaqueous, non-volatile, responsive to a change in the temperature, and includes a first, curable component and a second, non-volatile component. It should be appreciated by those of skill in the art that the phrase "substantially nonaqueous matrix composition" refers to a composition that may contain a deminimus amount of water, such that the matrix composition is not a hydrogel or other aqueous-based compositions that freezes at or near the freezing point of water. The matrix composition may include about 30-70 wt. % of the first component, with the balance being the second component and any incidental amount of residual solvent, starting materials (e.g., monomers), or the like.

The first curable, polymeric component of the matrix composition may be an organic polymer, such as polystyrene, polyurethane, acrylic polymers, alkyd polymers, polyester, siloxane-containing polymers, epoxy-containing polymers, and/or polymers derived from an epoxy-containing polymer. Suitable curable monomers for producing the first component include, but are not limited to, ethoxylated trimethylolpropane triacrylate, polyethylene glycol (600) diacrylate, polyethylene glycol (400) diacrylate, polyethylene glycol (200) diacrylate, and acrylic acid, followed by curing of the matrix composition to yield an organic matrix. Other suitable monomers for producing the first component may include polyethylene glycol (1000) diacrylate, methoxy polyethylene glycol (350) monoacrylate, methoxy polyethylene glycol (350) monomethacrylate, methoxy polyethylene glycol (550) monomethacrylate, methoxy polyethylene glycol (550) monoacrylate, ethoxylated$_{30}$ bisphenol A diacrylate, 2-(2-ethoxyethoxy)ethyl acrylate, acrylamide, hydroxyethyl acrylate, hydroxypropyl acrylate, polyethylene glycol (600) dimethacrylate, polyethylene glycol (400) dimethacrylate, ethoxylated$_{30}$ bisphenol A dimethacrylate, hydroxyethyl methacrylate, and hydroxypropyl methacrylate.

By being responsive to a change in temperature it is meant that a property of the thermally responsive material changes with a change in temperature, such that the wavelength of diffraction of the thermally responsive material shifts with a change in temperature. In the thermally responsive material of the present invention, a shift in the wavelength of diffraction is believed to be due at least in part due to a change in distance between the Bragg planes of the CCA. One suitable second component that causes a shift in the diffraction wavelength is an ionic liquid. Ionic liquids are typically salts, with a melting point below 100° C. The ionic liquid generally includes an irregular cation and an anion. Suitable non-limiting examples of cations include imidazolium, pyridinium, pyrrolidinium, phosphonium, ammonium, sulfonium, and suitable non-limiting examples of anions include alkylsulfate, tosylate, methane sulfonate, and suitable halides, tetrafluoroborate, and/or hexafluorophosphate. For example, the ionic liquid may be 1-butyl-2,3-dimethyl imidazolium tetrafluoroborate, 1-hexyl-3-methyl imidazolium tetrafluoroborate, and/or 1-hexyl-3-methyl imidazolium hexafluorophosphate. In the thermally responsive material of the present invention, it is believed that the solubility of the first component in the second component changes with temperature change. For example, at elevated temperatures, swelling of the first polymeric component increases the distance between Bragg planes of the CCA, which increases the diffraction wavelength. When the temperature is reduced, swelling of the first polymeric component is reversed, thereby decreasing the distance between Bragg planes and decreasing the diffraction wavelength. By non-volatile, it is meant that the vapor pressure of the second component is essentially zero and the second component does not evaporate under typical conditions of up to 100° C. at atmosphere pressure.

In one embodiment of the invention, the matrix composition is applied to a dried array of particles (core-shell or unitary) positioned on a substrate by coating the array of particles with the curable matrix composition that includes monomers or other polymer precursor materials, as disclosed in U.S. Pat. No. 6,894,086 (incorporated herein by reference) to interpenetrate the array of particles with the curable matrix composition, which is then cured. The volumetric ratio of the particles to the matrix in the thermally responsive material is typically about 25:75 to about 80:20. The curable matrix composition may be coated onto the dried array of particles via dipping, spraying, brushing, roll-coating, gravure coating, curtain coating, flow coating, slot-die coating, or ink-jet coating. By coating, it is meant that the curable matrix composition covers at least substantially the entirety of the array and at least in part fills the interstitial spaces between the particles. The second, non-volatile component may be included with the first, curable component when the array of particles is coated with the first, curable component. Alternatively, the array of particles may be coated with the first, curable component, which is cured and the resulting array fixed in the cured first component is treated with the second, non-volatile component to interpenetrate the cured first component with the second, non-volatile component.

Figure 1B:
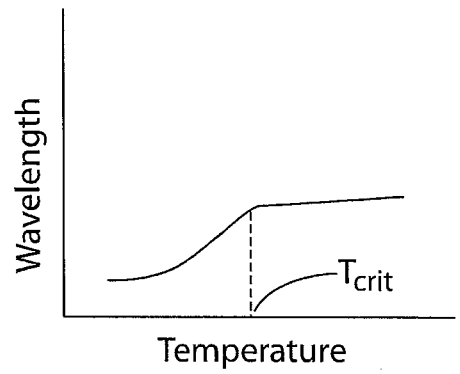
Figure 1C:
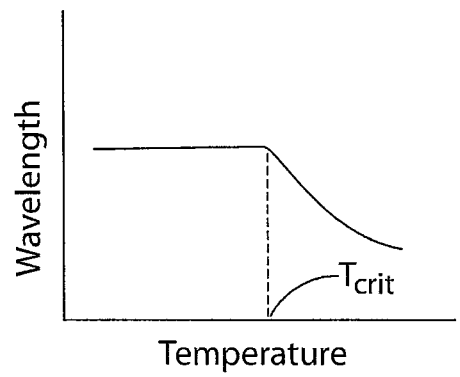
Figure 1D:
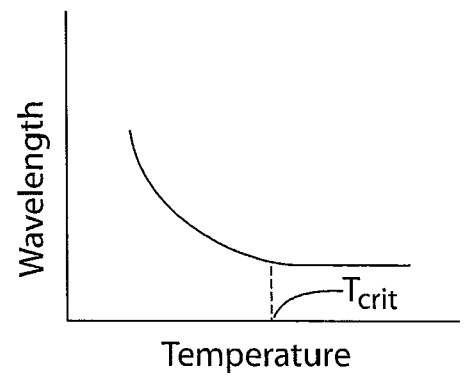

The response to temperature may be determined by the peak wavelength of diffraction (the diffraction peak) of the thermally responsive material at various temperatures of the material. It has been found that the relationship of the diffraction peaks of the thermally responsive material of the present invention as a function of temperature (shown schematically in FIGS. 1-3) can be controlled by selecting the compositions of the first and/or second matrix components. For example, the diffraction peak for a thermally responsive material of the present invention may be constant at temperatures between room temperature and a second, elevated temperature. When the material reaches a critical temperature ($T_{crit}$), the diffraction peak exhibits a red shift, i.e., the wavelength of diffraction increases with increasing temperature, as shown schematically in FIG. 1A. This phenomenon may be reversible so that upon cooling to a temperature below the critical temperature, the diffraction peak shifts back towards its original wavelength. Alternatively, in another thermally responsive material of the present invention, the diffraction wavelength may increase with temperature until a critical temperature is reached, with any further increase in temperature not shifting the diffraction wavelength as shown schematically in FIG. 1B. In other embodiments of the present invention, the diffractive peak may decrease with increased temperature, either after reaching a critical temperature as shown schematically in FIG. 1C or until a critical temperature is reached as shown in FIG. 1D. Thermally responsive material that exhibits a shift in the diffraction peak wavelength at a critical temperature may be used as a sensor to indicate that the material and/or an article bearing the material are at that temperature or are below or above that temperature. The thermally responsive material may be applied to a substrate in the form of indicia, such as lettering that shifts color with temperature change. For example, a road sign bearing a thermally responsive material that exhibits a shift in the diffraction peak wavelength at or near the freezing point of water, i.e., changes color at or below the freezing point of water, could serve to warn drivers of the risk of icy roads when the material drops to near the freezing point. The material may be applied to a road sign in lettering of "ICE WARNING," which is visible only when the temperature approaches or is less than 0° C. At temperatures above freezing, the lettering would be indistinct from the background, while at reduced temperature, the color of the lettering would change, so that the lettering stands out against the background. Similarly, a surface that reaches dangerous temperatures (e.g., on a stove) may bear indicia provided from the thermally responsive material. At safe temperatures, such as less than 50° C., the indicia is indistinct from the rest of the surface. When the surface reaches dangerous temperatures presenting a risk to the user of being burned when touched (e.g., over 70° C.), the material of the indicia changes color, such as in the form of the word "HOT" and appearing red. These are only non-limiting examples of uses of the material of the present invention. Likewise, a material of the present invention that exhibits a peak diffraction wavelength at an elevated temperature could function as a sensor for indicating that the elevated temperature has been reached. A maximum temperature sensor may be used to designate that a product (food, medicinal, etc.) has reached an unsafe temperature, such as over 30° C. or a temperature at which the product degrades or becomes unsafe.

In another embodiment, the thermally responsive material of the present invention exhibits a maximum diffraction peak as shown in FIG. 2A or a minimum diffraction peak as shown in FIG. 2B. Material that exhibits a maximum or minimum diffraction peak may likewise serve as sensors to indicate when the material reaches the temperature corresponding to the maximum or minimum diffraction peak.

In other embodiment of the present invention, the diffraction peak wavelength may be directly proportional or inversely proportional to temperature without exhibiting a critical temperature, as shown in FIGS. 3A and 3B, respectively. The wavelength versus temperature profiles shown in FIGS. 1-3 are examples of types of temperature response of the peak diffraction wavelength for the material of the present invention and are not meant to be limiting as to the temperature response of the material of the present invention.

The material of the present invention is also suitable for controlling radiation, such as infrared radiation, reflected from a surface bearing the material. In one embodiment, the thermally responsive material diffracts radiation in the visible spectrum (allowing transmission of infrared radiation) at a first temperature and diffracts infrared radiation (reflecting infrared radiation) at a second temperature. The second temperature may be higher than the first temperature so that at the first temperature, the thermally responsive material does not diffract (or reflect) infrared radiation while at the second temperature, the thermally responsive material diffracts (and reflects) infrared radiation. Such a thermally responsive material may be used to control or filter the type of radiation reaching an article bearing the material. For example, a building having a surface bearing the thermally responsive material would not reflect infrared radiation at the first temperature so that infrared radiation would be transmitted through the material to the underlying surface, thereby allowing radiation (i.e., energy) to reach the building surface and heat the building. When the thermally responsive material on the building surface reaches the second temperature, the diffraction peak of the material would shift from the visible range to the infrared range, thereby reflecting infrared radiation and preventing any further heating of the surface from infrared radiation. In this manner, the thermally responsive material of the present invention may function as a switchable (temperature sensitive) infrared radiation reflective material. The method of controlling radiation reflected from a surface may be used to control wavelengths of radiation other than infrared radiation, such as but not limited to visible or ultraviolet radiation.

As detailed below, the array of particles received in a matrix may be produced on a substrate that functions as a temporary support or on a substrate that is a desired end-use for the thermally responsive material. By temporary support, it is meant that the substrate is used to support production of the thermally responsive material of the present invention, which is subsequently removed therefrom in self-supporting form, such as, for example, a self-supporting film or comminuted particulate matter. A film of the thermally responsive material or particulates of the thermally responsive material may then be applied to another support or added to a composition (such as a coating composition) for its ultimate end-use. The end-use and final form of the thermally responsive material is not limited to those described herein.

Substrate

The substrate may be a flexible material, such as metal sheet or foil (e.g., aluminum foil), paper, or a film (or sheet) of polyester or polyethylene terephthalate (PET), or an inflexible material, such as glass or plastic. By "flexible" it is meant that the substrate can undergo mechanical stresses, such as bending, stretching, compression, and the like, without significant irreversible change. One suitable substrate is a microporous sheet. Some examples of microporous sheets are disclosed in U.S. Pat. Nos. 4,833,172; 4,861,644; and 6,114,023, which are incorporated herein by reference. Commercially available microporous sheets are sold under the designation Teslin® by PPG Industries, Inc. Other suitable flexible substrates include natural leather, synthetic leather, finished natural leather, finished synthetic leather, suede, vinyl nylon, ethylene vinyl acetate foam (EVA foam), thermoplastic urethane (TPU), fluid-filled bladders, polyolefins and polyolefin blends, polyvinyl acetate and copolymers, polyvinyl chloride and copolymers, urethane elastomers, synthetic textiles, and natural textiles.

In certain embodiments, the flexible substrates are compressible substrates. "Compressible substrate" and like terms refer to substrates capable of undergoing a compressive deformation and returning to substantially the same shape once the compressive deformation has ceased. The term "compressive deformation" means a mechanical stress that reduces the volume at least temporarily of a substrate in at least one direction. As noted above, the composite material of the present invention may be applied to a compressible substrate. "Compressible substrate" and like terms refer to a substrate capable of undergoing a compressive deformation and returning to substantially the same shape once the compressive deformation has ceased. The term "compressive deformation" and like terms mean a mechanical stress that reduces the volume at least temporarily of a substrate in at least one direction. A compressible substrate is one, for example, that has a compressive strain of 50% or greater, such as 70%, 75%, or 80% or greater. Particular examples of compressible substrates include those comprising foam and polymeric bladders filled with air, liquid, and/or plasma. "Foam" can be a polymeric or natural material comprising open cell foam and/or closed cell foam. "Open cell foam" means that the foam comprises a plurality of interconnected air chambers; "closed cell foam" means that the foam comprises discrete closed pores. Example foams include, but are not limited to, polystyrene foams, polyvinyl acetate and/or copolymers, polyvinyl chloride and/or copolymers, poly (meth)acrylimide foams, polyvinylchloride foams, polyurethane foams, thermoplastic urethane foams, polyolefinic foams, and polyolefin blends. Polyolefinic foams include, but are not limited to, polypropylene foams, polyethylene foams, and ethylene vinyl acetate (EVA) foams. "EVA foam" can comprise open cell foam, and/or closed cell foam. EVA foam can include flat sheets or slabs or molded EVA foams, such as shoe midsoles. Different types of EVA foam can have different types of surface porosity. Molded EVA foam can comprise a dense surface or skin, whereas flat sheets or slabs can exhibit a porous surface.

Polyurethane substrates according to the present invention include aromatic, aliphatic, and hybrid (hybrid examples are silicone polyether or polyester urethane and silicone carbonate urethane) polyester or polyether based thermoplastic urethane. By "plastic" is meant any of the common thermoplastic or thermosetting synthetic materials, including thermoplastic olefins (TPO) such as polyethylene and polypropylene and blends thereof, thermoplastic urethane, polycarbonate, sheet molding compound, reaction-injection molding compound, acrylonitrile-based materials, nylon, and the like. A particular plastic is a TPO that comprises polypropylene and EPDM (ethylene propylene diene monomer).

The thermally responsive material may be applied to an article in various ways. In one embodiment, the thermally responsive material is produced on a substrate and is then removed from the substrate and comminuted into particulate form, such as in the form of flakes. The comminuted thermally responsive material may be incorporated as an additive in a coating composition for applying to an article. It may be beneficial to minimize the haze in a coating composition containing the comminuted thermally responsive material. Reduced haze may be achieved by reducing the difference in refractive index between the matrix and particles of the composite material. However, a reduction in the refractive index difference generally reduces the intensity of refracted radiation. Therefore, when minimal haze is desired and the refractive index difference is reduced, intensity may be maintained by increasing the thickness of the thermally responsive material, i.e., by increasing the quantity of layers of particles in the CCA, as compared to material in which the refractive indices of the matrix and particles are more distinct from each other.

In one embodiment, the coating composition comprises a "hard coat," such as an alkoxide. The alkoxide can be further mixed and/or reacted with other compounds and/or polymers known in the art. Particularly suitable are compositions comprising siloxanes formed from at least partially hydrolyzing an organoalkoxysilane, such as one within the formula above. Examples of suitable alkoxide-containing compounds and methods for making them are described in U.S. Pat. Nos. 6,355,189; 6,264,859; 6,469,119; 6,180,248; 5,916,686; 5,401,579; 4,799,963; 5,344,712; 4,731,264; 4,753,827; 4,754,012; 4,814,017; 5,115,023; 5,035,745; 5,231,156; 5,199,979; and 6,106,605, which are incorporated by reference herein.

In certain embodiments, the alkoxide comprises a combination of a glycidoxy[($C_1$-$C_3$)alkyl]tri($C_1$-$C_4$)alkoxysilane monomer and a tetra($C_1$-$C_6$)alkoxysilane monomer. Glycidoxy[($C_1$-$C_3$)alkyl]tri($C_1$-$C_4$)alkoxysilane monomers suitable for use in the coating compositions of the present invention include glycidoxymethyltriethoxysilane, α-glycidoxyethyltrimethoxysilane, α-glycidoxyethyl-triethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyl-triethoxysilane, γ-glycidoxypropyltrimethoxysilane, hydrolysates thereof, and/or mixtures of such silane monomers. Suitable tetra($C_1$-$C_6$)alkoxysilanes that may be used in combination with the glycidoxy[($C_1$-$C_3$)alkyl]tri($C_1$-$C_4$) alkoxysilane in the coating compositions of the present invention include, for example, materials such as tetramethoxysilane, tetraethoxysilane, tetrapropoxysilane, tetrabutoxysilane, tetrapentyloxysilane, tetrahexyloxysilane, and mixtures thereof.

In certain embodiments, the glycidoxy[($C_1$-$C_3$)alkyl]tri($C_1$-$C_4$)alkoxysilane and tetra($C_1$-$C_6$)alkoxysilane monomers used in the coating compositions of the present invention are present in a weight ratio of glycidoxy[($C_1$-$C_3$)alkyl]tri($C_1$-$C_4$)alkoxysilane to tetra($C_1$-$C_6$)alkoxysilane of from 0.5:1 to 100:1, such as 0.75:1 to 50:1 and, in some cases, from 1:1 to 5:1. In certain embodiments, the alkoxide is at least partially hydrolyzed before it is combined with other components of the coating composition, such as polymer-enclosed color-imparting particles. Such a hydrolysis reaction is described in U.S. Pat. No. 6,355,189 at column 3, lines 7 to 28, the cited portion of which is incorporated by reference herein. In certain embodiments, water is provided in an amount necessary for the hydrolysis of the hydrolyzable alkoxide(s). For example, in certain embodiments, water is present in an amount of at least 1.5 moles of water per mole of hydrolyzable alkoxide. In certain embodiments, atmospheric moisture, if sufficient, can be adequate.

In certain embodiments, a catalyst is provided to catalyze the hydrolysis and condensation reaction. In certain embodiments, the catalyst is an acidic material and/or a material different from the acidic material which generates an acid upon exposure to actinic radiation. In certain embodiments, the acidic material is chosen from an organic acid, inorganic acid, or mixture thereof. Non-limiting examples of such materials include acetic, formic, glutaric, maleic, nitric, hydrochloric, phosphoric, hydrofluoric, sulfuric acid, or mixtures thereof.

Any material that generates an acid on exposure to actinic radiation can be used as a hydrolysis and condensation catalyst in the coating compositions of the present invention, such as a Lewis acid and/or a Bronsted acid. Non-limiting examples of acid-generating compounds include onium salts and iodosyl salts, aromatic diazonium salts, metallocenium salts, o-nitrobenzaldehyde, the polyoxymethylene polymers described in U.S. Pat. No. 3,991,033, the o-nitrocarbinol esters described in U.S. Pat. No. 3,849,137, the o-nitrophenyl acetals, their polyesters, and end-capped derivatives described in U.S. Pat. No. 4,086,210, sulphonate esters, or aromatic alcohols containing a carbonyl group in a position alpha or beta to the sulphonate ester group, N-sulphonyloxy derivatives of an aromatic amide or imide, aromatic oxime sulphonates, quinone diazides, and resins containing benzoin groups in the chain, such as those described in U.S. Pat. No. 4,368,253. Examples of these radiation activated acid catalysts are also disclosed in U.S. Pat. No. 5,451,345.

In certain embodiments, the acid generating compound is a cationic photoinitiator, such as an onium salt. Non-limiting examples of such materials include diaryliodonium salts and triarylsulfonium salts, which are commercially available as SarCat® CD-1012 and CD-1011 from Sartomer Company. Other suitable onium salts are described in U.S. Pat. No. 5,639,802, column 8, line 59 to column 10, line 46. Examples of such onium salts include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate, and mixtures thereof.

The amount of catalyst used in the coating compositions of the present invention can vary widely and depend on the particular materials used. Only the amount required to catalyze and/or to initiate the hydrolysis and condensation reaction is required, e.g., a catalyzing amount. In certain embodiments, the acidic material and/or acid generating material can be used in an amount from 0.01 to 5% by weight, based on the total weight of the composition.

The thermally responsive material of the present invention may be used in marking devices, including documents of value, articles of manufacture and their packaging, and credentials documents, particularly of an anti-counterfeiting device. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationery, lottery tickets, chips and/or tokens, controlled items (e.g., evidence), key cards, keys, tracing and tracking items, and as a portion of a barcode. Articles of manufacture or packaging of articles of manufacture may include aircraft parts, automotive parts, such as vehicle identification numbers, pharmaceutical products and personal care products, recorded media, clothing and footwear, electronic devices, batteries, ophthalmic devices, alcohol, food items, printing inks and printing consumables, writing implements, luxury items, such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings, and windows and transparencies. Examples of credentials which may bear the thermally responsive material of the present invention include drivers' licenses, identification cards (government, corporate, and educational) passports, visas, marriage certificates, hospital bracelets, and diplomas. These examples are not meant to be limiting and are only a sampling of devices that may bear the thermally responsive material of the present invention. Such uses are not meant to be limiting.

In addition, the thermally responsive material may be produced in the form of a film, which is then applied to an article, such as via an adhesive or the like.

Alternatively, the article itself may serve as a substrate by applying the thermally responsive material directly to the housing of the article, such as the housing of electronic devices or directly to goods such as athletic equipment, accessories, optical lenses, optical frames, clothing, including shoes and the like.

The thermally responsive material of the present invention may be used to authenticate an article, such as to authenticate a document or device or to identify the source of a manufactured product. A document, such as a security card, that bears the thermally responsive material of the present invention would be considered to be authentic if the article bearing the thermally responsive material exhibits the properties thereof, such as responsiveness to temperature change. A "security card" includes documents or devices that authenticate the identity of the bearer thereof or permit access to a facility, such as in the form of a badge. The security card may identify the bearer of the card (e.g., a photo-identification card or a passport) or may function as a document or device that indicates that the bearer thereof is to be permitted access to a secure facility. For example, a security card that appears to be authentic may be tested for having properties of diffracting a particular wavelength of radiation at a particular temperature.

A counterfeit security card would fail to exhibit that property. Likewise, consumers of an item (such as a pharmaceutical product) provided in packaging bearing the thermally switchable material of the present invention can test the packaging for its authenticity by testing the response of its thermally responsive properties to temperature changes. Packaging which does not respond appropriately would be considered to be counterfeit, while packaging that does exhibit the property would be considered to be authentic. Other consumer goods may include the thermally responsive material of the present invention, such as on the housing of a manufactured product (e.g., electronic devices) or on the surface of an article of clothing (e.g., shoes). These examples of articles for authentication and the temperature response by the material of the present invention applied thereto are not meant to be limiting. Articles for authentication could include thermally responsive material exhibiting one of the temperature responses shown schematically in FIGS. 1-3 or another particular temperature response, which may be used as an indicator of the authenticity of the article.

The thermally responsive material may further be at least partially covered with a coating composition in a multi-layered structure. In one embodiment, the composite material is coated with the above-described "hard coat" coating composition. In another embodiment, the composite material is coated with an anti-reflective coating, such as in a multi-layered, anti-reflective stack. The anti-reflective coating may be formed of a dielectric material, e.g., metal oxides, such as $Zn_2SnO_4$, $In_2SO_4$, $SnO_2$, $TiO_2$, $In_2O_3$, $ZnO$, $Si_3N_4$, and/or $Bi_2O_3$ deposited by sputtering.

The following examples are presented to demonstrate the general principles of the invention. The invention should not be considered as limited to the specific examples presented. All parts are by weight unless otherwise indicated.

EXAMPLES

Example 1

Array of Core/Shell Particles

A dispersion of particles having polystyrene-divinylbenzene cores and styrene-methyl methacrylate-ethylene glycol dimethacrylate-divinylbenzene shells in water was prepared via the following procedure. 4.9 Grams (g) of sodium bicarbonate from Aldrich Chemical Company, Inc., was mixed with 4090 g deionized water and added to a 12 liter reaction kettle equipped with a thermocouple, heating mantle, stirrer, reflux condenser, and nitrogen inlet. The mixture was sparged with nitrogen for 43 minutes with stirring and then blanketed with nitrogen. Aerosol MA80-I (58.2 g in 410 g deionized water) from Cytec Industries, Inc., was added to the mixture with stirring followed by a 48 g deionized water rinse. The mixture was heated to approximately 50° C. using a heating mantle. Styrene monomer (832.8 g), available from Aldrich Chemical Company, Inc., was added with stirring. The mixture was heated to 60° C. Sodium persulfate from the Aldrich Chemical Company, Inc. (12.5 g in 144 g deionized water) was added to the mixture with stirring. The temperature of the mixture was held constant for 40 minutes. Under agitation, divinylbenzene from Aldrich Chemical Company, Inc. (205.4 g) was added to the mixture and the temperature was held at approximately 60° C. for 2.3 hours. Brij 35 (polyoxyethylene (23) lauryl ether) from the Aldrich Chemical Company, Inc. (5.0 g in 100 g deionized water) was added to the mixture with stirring. Next, sodium persulfate from the Aldrich Chemical Company, Inc. (9.1 g in 900 g deionized water) was added to the mixture with stirring. A mixture of styrene (200 g), methyl methacrylate (478.8 g), ethylene glycol dimethacrylate (48 g) and divinylbenzene (30.2 g) all available from Aldrich Chemical Company, Inc., was added to the reaction mixture with stirring. Sipomer COPS-I (3-allyloxy-2-hydroxy-1-propanesulfonic acid 82.7 g) from Rhodia, Inc., Cranbury, N.J., was added to the reaction mixture with stirring and was followed by a (100 g) deionized water charge. The temperature of the mixture was maintained at 60° C. for approximately 4 hours. The resulting polymer dispersion was filtered through a 5 micron filter bag. The polymer dispersion was then ultrafiltered using a 4 inch ultrafiltration housing with a 2.41 inch polyvinylidine fluoride membrane, both from PTI Advanced Filtration, Inc. Oxnard, Calif., and pumped using a peristaltic pump at a flow rate of approximately 170 ml per second. Deionized water (2985 g) was added to the dispersion after 3000 g of ultrafiltrate had been removed. This exchange was repeated several times until 11,349 g of ultrafiltrate had been replaced with 11,348 g deionized water. Additional ultrafiltrate was then removed until the solids content of the mixture was 44.8% by weight. The material was applied via slot-die coater from Frontier Industrial Technology, Inc., Towanda, Pa. to a 2 mil thick polyethylene terephthalate (PET) substrate and dried at 180° F. for 40 seconds to a dry thickness of approximately 7 microns. The resulting material diffracted light at 478 nm measured with a Cary 500 spectrophotometer from Varian, Inc.

Examples 2-5

CCA with Ionic Liquids

Example 2

An ultraviolet (UV) radiation curable organic composition was prepared via the following procedure. Diphenyl(2,4,6-trimethylbenzoyl)phosphine oxide/2-hydroxy-2-methyl-propiophenone (0.05 g), 50/50 blend from Aldrich Chemical Company, Inc., Milwaukee, Wis., was added with stirring to 1 g of 1-butyl-2,3-dimethylimidazolium tetrafluoroborate from Aldrich Chemical Company, Inc., 0.1 g of polyethylene glycol (400) dimethacrylate (SR603) from Sartomer Company, Inc., Exton, Pa., 0.9 g hydroxyethyl acrylate from Aldrich Chemical Company, Inc.

The UV curable composition was applied to the polystyrene-divinylbenzene core styrene-methyl methacrylate-ethylene glycol dimethacrylate-divinylbenzene shell particles from Example 1 using a drawdown bar. A piece of 2 mil thick PET film was then placed upon the UV curable composition so that the material was entirely covered. A roller was used on the top side of the PET substrate to spread out and force the UV curable coating into the interstitial spaces of the material from Example 1. The sample was then ultraviolet radiation cured using a 100 W mercury lamp. The two layers of PET were then separated.

Figure 4:
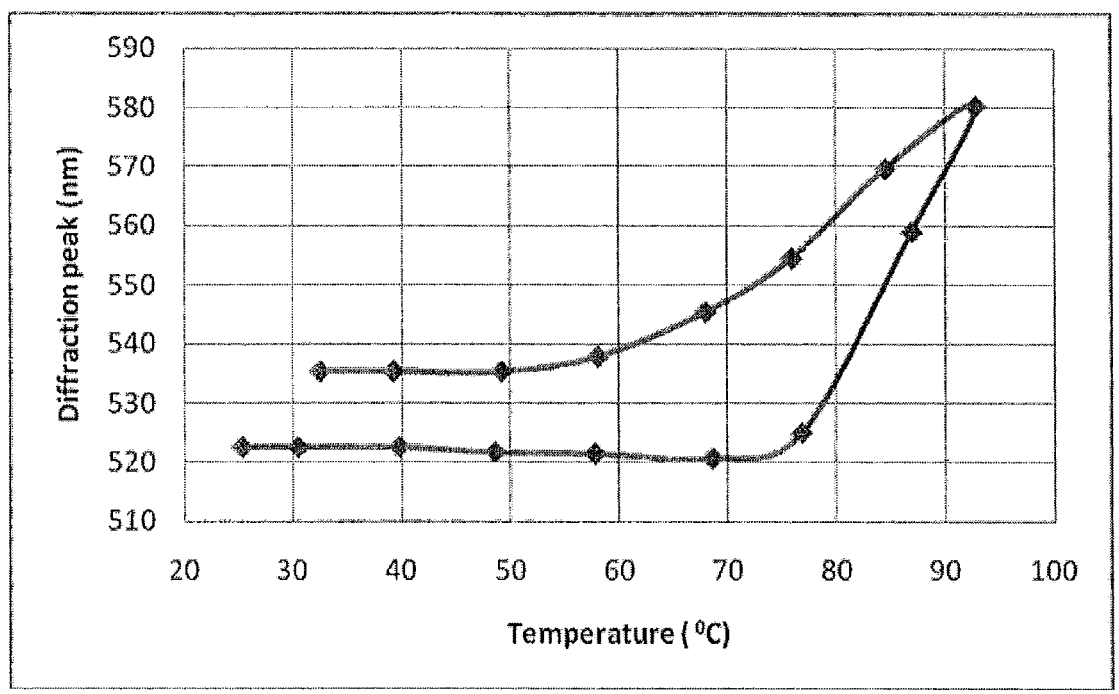
FIG. 4 is a graph of the temperature response of the material produced in Example 2.

The film was then immersed in 1-butyl-2,3-dimethylimidazolium tetrafluoroborate. The immersed film temperature was controlled using a recycling water bath. An Ocean Optics USB2000 spectrometer was used to measure the diffraction peak shift from the normal angle when the water bath temperature changed. The results are shown in FIG. 4. The original diffraction peak was about 522 nm. When the temperature increased above 75° C., the wavelength of the diffraction peak began to lengthen (a red shift), reaching to 580 nm at 93° C., shown by the lower curve. When the temperature was reduced, the wavelength of the diffraction peak shortened (a blue shift) and approached the original as shown by the upper curve.

Example 3

Figure 5:
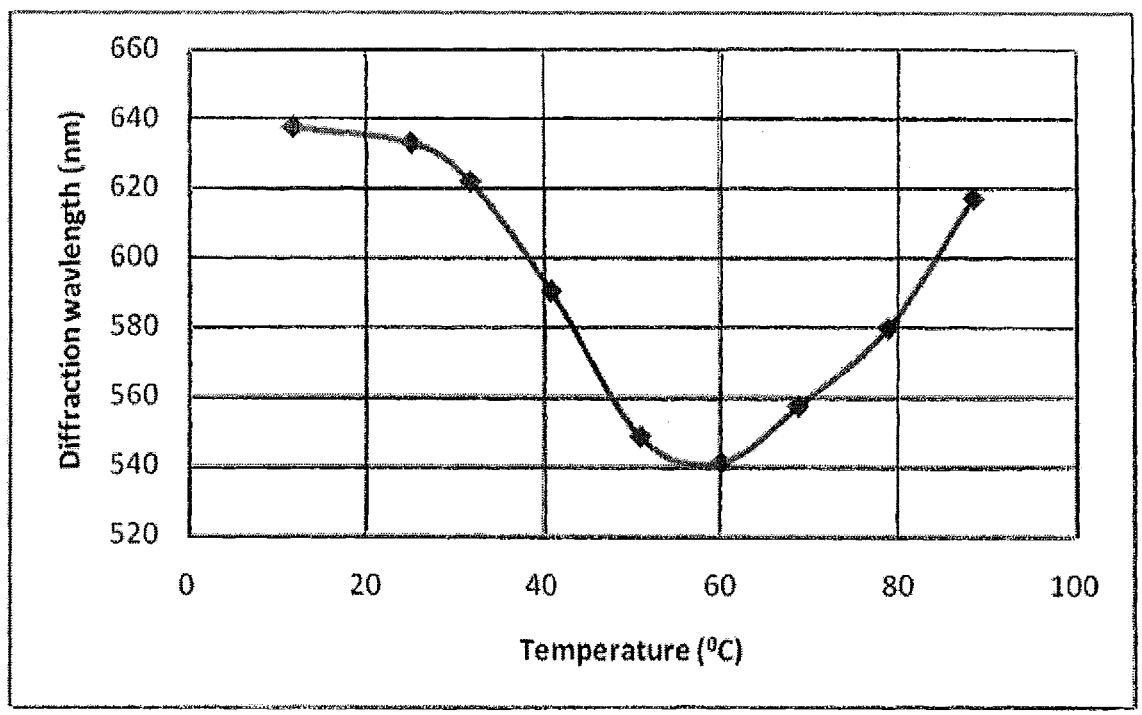
FIG. 5 is a graph of the temperature response of the material produced in Example 3.

Example 2 was repeated, except that 1-butyl-2,3-dimethylimidazolium tetrafluoroborate was replaced by 1-hexyl-3-dimethylimidazolium tetrafluoroborate. The variation of diffraction peak with temperature is shown in FIG. 5. When the temperature was increased from 10° C., the diffraction peak first shifted to shorter wavelengths (blue shift) and reached the minimum wavelength at about 60° C. When the temperature was further increased, the wavelength of the diffraction peak began to lengthen (a red shift).

Example 4

Figure 6:
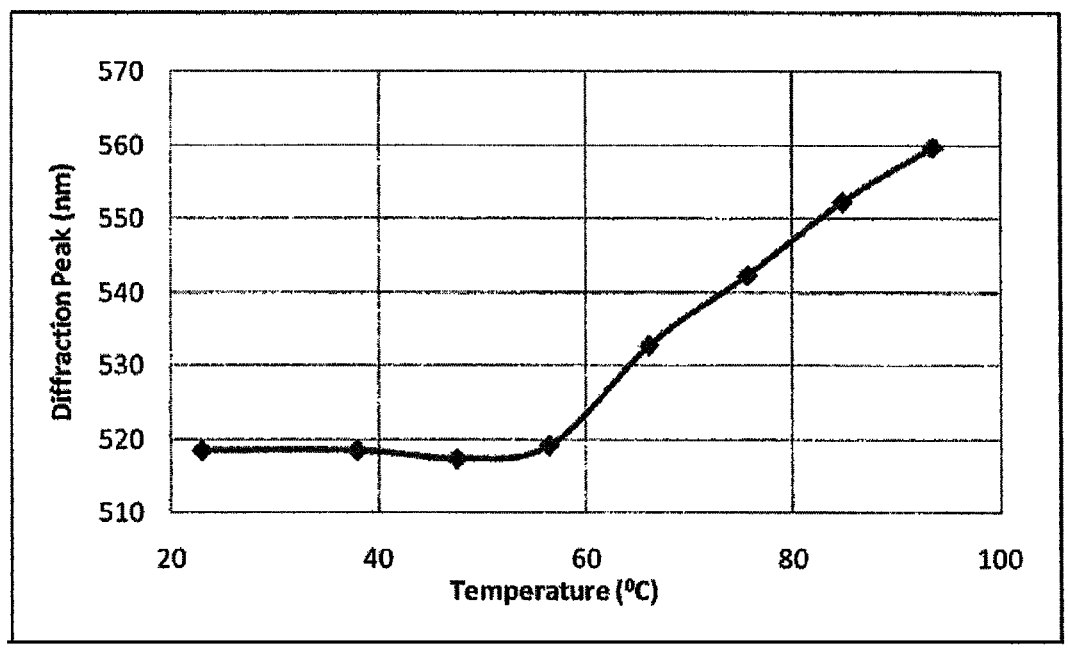
FIG. 6 is a graph of the temperature response of the material produced in Example 4.

Example 2 was repeated, except that 1-butyl-2,3-dimethylimidazolium tetrafluoroborate was replaced by 1-hexyl-3-methylimidazolium tetrafluoroborate, and hydroethyl acrylate was replaced by hydroxypropyl methacrylate. The variation of the diffraction peak with temperature is shown in FIG. 6. When the temperature was increased above about 55° C., the wavelength of the diffraction peak monotonically increased (red shifted).

Example 5

Figure 7:
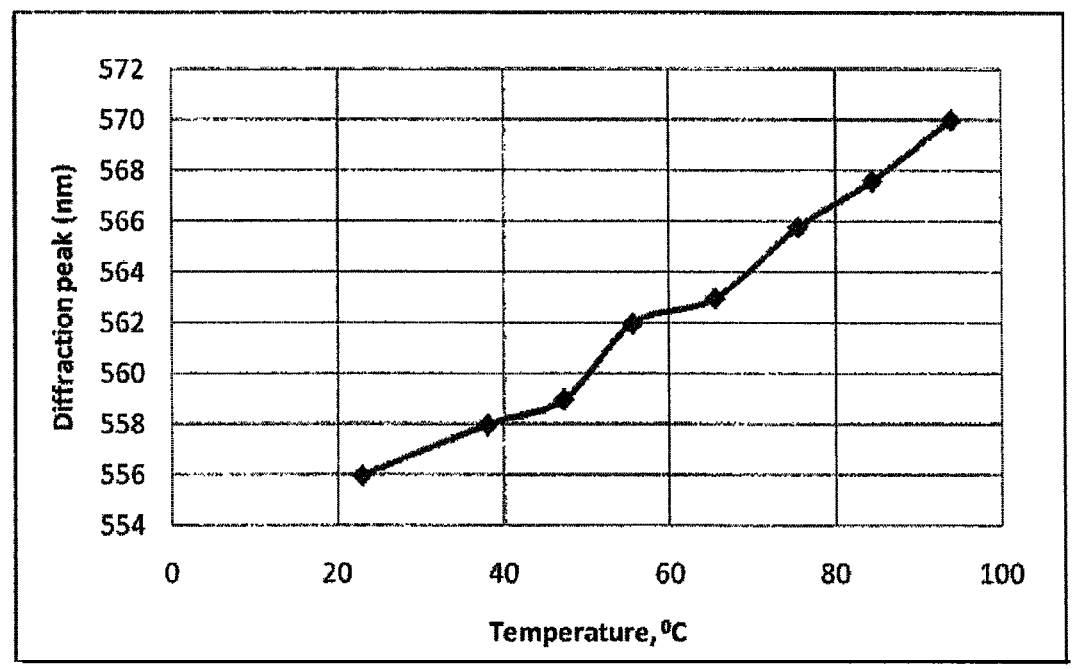
FIG. 7 is a graph of the temperature response of the material produced in Example 5.

Example 2 was repeated, except that 1-butyl-2,3-dimethylimidazolium tetrafluoroborate was replaced by 1-hexyl-3-methylimidazolium hexafluorophosphate, and hydroethyl acrylate was replaced by hydroxybutyl acrylate. The variation of the diffraction peak with temperature is shown in FIG. 7. When the temperature was increased, the wavelength of the diffraction peak monotonically increased (red shifted).

Example 6

Image

The UV curable organic composition of Example 2 was applied to the array of core-shell particles from Example 1 using a drawdown bar. A coversheet of 2 mil thick PET film was then placed upon the UV curable composition so that the material was entirely covered. A roller was used on the top side of the PET sheet to spread out and force the UV curable composition into the interstitial spaces of the array from Example 1. The material was further covered with a transparency film bearing an image of "HOT!" and then ultraviolet radiation cured using a 100 W mercury lamp. After 10 seconds of UV exposure, the two layers of PET were separated. The area cured by UV was stuck to the coversheet and removed therewith, while the uncured portion remained positioned on the original substrate with a "HOT!" image. The image was laminated to a black chart, cured with UV lamps for 17 seconds and treated with a non-volatile component (1-butyl-2,3-dimethylimidazolium tetrafluoroborate) by applying the non-volatile component to the image on a heating plate. When the temperature was lower than 60° C., a green "HOT!" image was observed. When the temperature was increased up to 85° C., the "HOT!" image changed to red. When it was cooled down, the "HOT!" image changed back to green.

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A thermally responsive material comprising an ordered periodic array of particles received in a substantially non-aqueous matrix composition, wherein said material diffracts radiation in a first wavelength band when said material is at a first temperature and said material diffracts radiation in a second wavelength band when said material is at a second temperature.

2. The thermally responsive material of claim 1 wherein said matrix composition comprises a non-volatile component.

3. The thermally responsive material of claim 1 wherein said matrix composition comprises an ionic liquid.

4. The thermally responsive material of claim 3 wherein said ionic liquid comprises (i) a cation comprising imidazolium, pyridinium, pyrrolidinium, phosphonium, ammonium, sulfonium, alkylsulfate, tosylate, and/or methane sulfonate and (ii) an anion comprising a halide, tetrafluoroborate, hexafluorophosphate, and/or bis(trifluoromethylsulfonyl) imide.

5. The thermally responsive material of claim 3 wherein said matrix composition further comprises a cured component.

6. The thermally responsive material of claim 5 wherein said cured component is swellable by said ionic liquid.

7. The thermally responsive material of claim 5 wherein said cured component comprises an acrylic polymer.

8. The thermally responsive material of claim 7 wherein said ionic liquid swells said acrylic polymers.

9. The thermally responsive material of claim 3 wherein said matrix composition comprises about 30-70 wt. % of said ionic liquid.

10. The thermally responsive material of claim 1 wherein said second temperature is greater than 0° C.

11. The thermally responsive material of claim 1 wherein said second temperature is greater than 30° C.

12. The thermally responsive material of claim 1 wherein said second temperature is less than 0° C.

13. A method of controlling radiation reflected from a surface of a substrate comprising:
    applying the thermally responsive material of claim 1 to at least a portion of a surface of a substrate; and
    exposing the substrate surface bearing the thermally responsive material to radiation at an exposure temperature, such that the material reflects a wavelength band of radiation at the exposure temperature.

14. The method of claim 13 wherein the reflected wavelength band comprises infrared radiation.

15. The method of claim 13 wherein the reflected wavelength band comprises visible radiation.

16. The method of claim 15 wherein the exposure temperature is below 0° C.

17. A method of making a thermally responsive material comprising:
    providing an ordered periodic array of particles on a substrate;
    coating the array of particles with a substantially nonaqueous curable matrix composition, wherein the matrix composition comprises (i) a curable component and (ii) a component that swells the curable component in response to a change in temperature; and
    curing the matrix composition to produce material that diffracts radiation.

18. The method of claim 17 wherein the matrix composition component that swells the curable component comprises an ionic liquid.

19. The method of claim 18 wherein the matrix composition comprises about 30-70 wt. % of ionic liquid.

20. The method of claim 18 wherein the curable component comprises an acrylic monomer.

* * * * *